US008400931B2

(12) United States Patent
Wong et al.

(10) Patent No.: US 8,400,931 B2
(45) Date of Patent: Mar. 19, 2013

(54) CIRCUIT-SWITCHED SERVICES OVER LTE

(75) Inventors: Gavin Wong, Newbury (GB); David Andrew Fox, Newbury (GB); Christopher David Pudney, Newbury (GB)

(73) Assignee: Vodafone IP Licensing Limited, Newbury, Berkshire (GB)

( * ) Notice: Subject to any disclaimer, the term of this patent is extended or adjusted under 35 U.S.C. 154(b) by 190 days.

(21) Appl. No.: 12/807,256

(22) Filed: Aug. 31, 2010

(65) Prior Publication Data

US 2011/0069618 A1    Mar. 24, 2011

(30) Foreign Application Priority Data

Sep. 1, 2009  (GB) .................................... 0915152.3

(51) Int. Cl.
*G01R 31/08* (2006.01)
(52) U.S. Cl. ........................................................ 370/244
(58) Field of Classification Search .................. 370/203,
370/204–215, 229–240, 310–337, 338–350,
370/351–394, 395.1, 395.3, 395.4, 395.41,
370/395.42, 395.5, 395.52, 395.53, 412–421,
370/431–457, 458–463, 464–497, 498–529
See application file for complete search history.

(56) References Cited

U.S. PATENT DOCUMENTS

| | | | | |
|---|---|---|---|---|
| 6,963,544 B1* | 11/2005 | Balachandran et al. | ...... | 370/281 |
| 8,068,501 B2* | 11/2011 | Janakiraman et al. | ..... | 370/395.6 |
| 8,134,955 B2* | 3/2012 | Rahman et al. | ............... | 370/328 |
| 8,170,607 B2* | 5/2012 | Martin | ........................ | 455/552.1 |
| 2008/0291874 A1* | 11/2008 | Bae et al. | ....................... | 370/331 |
| 2009/0225725 A1* | 9/2009 | Zhu | ............................... | 370/331 |
| 2009/0265543 A1* | 10/2009 | Khetawat et al. | ............. | 713/151 |
| 2009/0268635 A1* | 10/2009 | Gallagher et al. | ............ | 370/254 |
| 2009/0274122 A1* | 11/2009 | Wu | ................................ | 370/331 |
| 2010/0069101 A1* | 3/2010 | Mahdi et al. | ................... | 455/466 |
| 2010/0074224 A1* | 3/2010 | Mahdi et al. | ................... | 370/331 |
| 2010/0075679 A1* | 3/2010 | Tenny et al. | ................... | 455/436 |
| 2010/0077459 A1* | 3/2010 | Mahdi et al. | ...................... | 726/4 |

(Continued)

FOREIGN PATENT DOCUMENTS

WO    WO 2009/056932 A2    10/2008

OTHER PUBLICATIONS

Bouygues Telecom, T Mobile, "Adding further clarifications to Alternative 1 (eMSC proposal)", 3GPP TSG SA WG2 Meeting #61, TD S2-075611, 3rd Generation Partnership Project (3GPP), vol. SA WG2, no. Ljubljana; 20071116, Nov. 12-16, 2007, XP050262262, 12 pp.

(Continued)

*Primary Examiner* — Kwang B Yao
*Assistant Examiner* — Jung Liu
(74) *Attorney, Agent, or Firm* — Muirhead and Saturnelli, LLC

(57) ABSTRACT

A mobile radio communication system and method of initiating a circuit-switched service at a mobile station over a System Architecture Evolution (SAE) core network using packet-switched communications between the mobile station and the SAE core network is provided. The method includes communicating service handling information between a Mobile Switching Centre (MSC) and the mobile station through a Mobility Management Entity (MME) of the SAE core network; sending instructions from the MSC for setting up the circuit-switched service through a Media Gateway, coupled to at least one network external to the SAE core network; providing packet-switched addressing information for the Media Gateway to the mobile station; and initiating the circuit-switched service at the mobile station over the SAE core network and through the Media Gateway.

18 Claims, 4 Drawing Sheets

U.S. PATENT DOCUMENTS

| | | | |
|---|---|---|---|
| 2010/0093345 A1* | 4/2010 | Verhoef et al. | 455/433 |
| 2010/0142389 A1* | 6/2010 | Imbimbo et al. | 370/252 |
| 2010/0165948 A1* | 7/2010 | Ore et al. | 370/331 |
| 2010/0182912 A1* | 7/2010 | Hongisto et al. | 370/242 |
| 2010/0208670 A1* | 8/2010 | Zisimopoulos et al. | 370/329 |
| 2010/0265884 A1* | 10/2010 | Vikberg et al. | 370/328 |
| 2011/0199947 A1* | 8/2011 | Strobl et al. | 370/310 |

OTHER PUBLICATIONS

S2-095143, "CSFB optimization based on SRVCC," 3GPP TSG-SA WG2 Meeting #75, Kyoto, Japan, Aug. 31-Sep. 4, 2009, 12 pp.

S2-095144, Change Request, "Enhanced CSFB solution based on SRVCC," 3GPP TSG-SA WG2 Meeting #75, Kyoto, Japan, Aug. 31-Sep. 4, 2009, 14 pp.

S2-095178, Change Request, "SMS over SGs: Online and offline charging aspects," 3GPP TSG-SA WG2 Meeting #75, Kyoto, Japan, Aug. 31-Sep. 4, 2009, 7 pp.

ETSI TS 123.272 V8.4.0 (Jun. 2009), Digital cellular telecommunications system (Phase 2+); Universal Mobile Telecommunications System (UMTS); LTE; Circuit Switched (CS) fallback in Evolved Packet System (EPS); Stage 2 (3GPP TS 23.272 version 8.4.0 Release 8), 49 pp.

3GPP TR 23.879 V9.0.0 (Mar. 2009), $3^{rd}$ Generation Partnership Project; Technical Specification Group Services and System Aspects; Study on Circuit Switched (CS) domain services over evolved Packet Switched (PS) access; Stage 2 (Release 9), 60 pp.

3GPP TS 24.007 V8.2.0 (Jun. 2009), $3^{rd}$ Generation Partnership Project; Technical Specification Core Group Network and Terminals; Mobile radio interface signalling layer 3; General aspects (Release 8), 149 pp.

3GPP TS 24.008 V8.6.0 (Jun. 2009), $3^{rd}$ Generation Partnership Project; Technical Specification Group Core Network and Terminals; Mobile radio interface Layer 3 specification; Core network protocols; Stage 3 (Release 8), pp. 1-150.

3GPP TS 24.301 V8.2.1 (Jun. 2009), $3^{rd}$ Generation Partnership Project; Technical Specification Core Group Network and Terminals; Non-Access-Stratum (NAS) protocol for Evolved Packet System (EPS); Stage 3 (Release 8), 252 pp.

3GPP TS 29.118 V8.2.0 (Jun. 2009), $3^{rd}$ Generation Partnership Project; Technical Specification Group Core Network and Terminals; Mobility Management Entity (MME)—Visitor Location Register (VLR) SGs interface specification (Release 8), 52 pp.

* cited by examiner

CIRCUIT-SWITCHED SERVICES OVER LTE

TECHNICAL FIELD

This application relates to a method of initiating a circuit-switched service at a mobile station over a System Architecture Evolution (SAE) Core Network, which forms part of a Long Term Evolution (LTE) system. This application also relates to a mobile radio communications system including an SAE Core Network.

BACKGROUND OF THE INVENTION

The Third Generation Partnership Project (3GPP) has developed standards for a cellular communications system, referred to as Long Term Evolution (LTE). LTE uses a Radio Access Network (RAN) based on Orthogonal Frequency Division Multiplexed (OFDM) communication. It also includes a System Architecture Evolution (SAE) Core Network. This comprises a Mobility Management Entity (MME) node, which provides control functionality for the RAN and a Serving Gateway for provision of user data to the RAN.

The LTE RAN (also referred to as E-UTRAN) and SAE Core Network provide all services using packed-switched communications, particularly using Internet Protocol (IP). Providing circuit-switched services, such as voice connections, is therefore a challenge in the LTE system, because service-specific structures are desirable to guarantee a minimum Quality of Service (QoS).

A number of architectural frameworks for handling specifically voice calls have been explored. These include: IP Multimedia Subsystem (IMS); Circuit Switched Fall Back (CSFB); Voice over LTE Generic Access (VOLGA); and Camping voice devices on GSM EDGE Radio Access Network (GERAN) or UMTS Radio Access Network (UTRAN). These and other systems for voice call handling are documented in "3rd Generation Partnership Project; Study on Circuit Switched (CS) domain services over evolved Packet Switched (PS) access; Stage 2" (3GPP TR 23.879 V9.0.0), which is incorporated herein by reference.

This multitude of implementations is a difficulty for designers of network and user equipment. Equipment manufactures and network operators would like to reduce the number of architectural frameworks for which they provide functionality.

One of the more favoured frameworks is CSFB, which is specified in ETSI TS 123 272 V8.4.0, which is incorporated herein by reference. This permits a mobile device to receive service normally from an LTE RAN. However, the architecture pushes the mobile device onto a GERAN or UTRAN system to provide voice call service.

However, there are several drawbacks to this framework. One particular challenge is that there can be a significant delay in setting up a circuit-switched call using this approach. This is due to the additional communication requirements between the LTE RAN and GERAN or UTRAN system and the need for the mobile device to establish communication with the GERAN or UTRAN system. Documents S2-095143 and S2-095144 from the 3GPP TSG-SA WG2 Meeting number 75, which are incorporated herein by reference, discuss some of the performance disadvantages of CSFB and propose some improvements which have the potential to reduce call set up delay and improve call setup reliability.

Another difficulty is that the Short Message Service (SMS) is not easily provided using the CSFB framework. This problem was addressed in WO-2009/056932, which is incorporated herein by reference. This implementation made use of the interface between the MME of the SAE Core Network and a Mobile Switching Centre (MSC) to provide SMS. The MSC provides legacy services to the LTE RAN and to the GERAN and UTRAN systems. The interface between the MME and MSC was originally intended for Paging and Mobility Management signaling. However, by extending this interface to provide SMS from the MSC to MME and using Non-Access-Stratum (NAS) signaling support between the mobile device and MME, full SMS services can be provided over the LTE RAN. Nevertheless, in view of the restrictions in the interface between the MME and MSC, referred to as the SGs interface, other higher bit-rate circuit-switched traffic cannot easily be communicated using this approach.

A further issue is that the CSFB approach requires that the mobile device can communicate with a GERAN or UTRAN system. This may not be possible in some cases, because the GERAN or UTRAN system may not have sufficient capacity to provide an additional service. Also, LTE networks may be operated in a frequency band around 800 MHz, which is lower than that used by known GERAN or UTRAN systems. Radio propagation is improved at this frequency. In conjunction with the more efficient use of radio bandwidth by the LTE RAN (for example, the use of OFDM and multiple antennas), it may provide radio service coverage over a wider area than other systems. Consequently, a mobile device served by an LTE RAN may not be able to receive service from another network.

It is therefore desirable to provide circuit-switched services, especially voice calling, in an efficient way over the LTE RAN, without the need for significant modifications to the RAN and Core Network.,

SUMMARY OF THE INVENTION

According to the system described herein, there is provided a method of initiating a circuit-switched service at a mobile station over a System Architecture Evolution, SAE, core network using packet-switched communications between the mobile station and the SAE core network. The method comprises: communicating service handling information between a Mobile Switching Centre, MSC, and the mobile station through a Mobility Management Entity, MME, of the SAE core network; sending instructions from the MSC for setting up the circuit-switched service through a Media Gateway, coupled to at least one network external to the SAE core network; providing packet-switched addressing information for the Media Gateway to the mobile station; and initiating the circuit-switched service at the mobile station over the SAE core network and through the Media Gateway.

This approach includes relatively minor modifications to the LTE RAN and SAE Core Network. Control and handling for the circuit-switched service are provided by the MSC, in the same way as they would be when GERAN or UTRAN are used. However, the LTE RAN does not provide a communications interface between the mobile User Equipment (UE) and the MSC. This is overcome by using the interface between the MME of the SAE Core Network and the MSC. Then, rather than switching the UE from the LTE RAN to another RAN, the MSC sends the circuit-switched traffic for the user via a Media Gateway. The UE is provided with a packet-switching address for the Media Gateway to enable the circuit-switched service to run through it using packet-switched traffic. Service (call) set-up time is therefore kept short, since there is no need for the UE to change the RAN being used. Also, minimum changes are needed to the RAN and Core Network to implement this solution.

The packet-switched addressing information may include an Internet Protocol, IP, address. In this embodiment, the service handling information is communicated between the mobile station and MME using a Non Access Stratum, NAS, protocol.

In various embodiments, the step of communicating service handling information may include communicating an encapsulated connection setup message between the MSC and MME over a SGs interface. In this way, the communication between the UE and the MSC for service handling data is essentially transparent to the MME.

It is advantageous to send the connection set up message in accordance with the corresponding messages that would be sent over GERAN or UTRAN. To achieve this, the MSC receives a command to initiate the circuit-switched service and the encapsulated connection setup message identifies a least one of: the terminating party telephone number; the IP address of the mobile station; and an Access Point Name. The command to initiate the circuit-switched service may come from the mobile station in a mobile originating call or it may come from an external network in a mobile terminating call. In a mobile originating call, the encapsulated connection setup message is sent from the mobile station to the MSC-s. In a mobile terminating call, the MSC-s sends an initial encapsulated connection setup message and the mobile station responds with a call confirmed encapsulated connection setup message that identifies the information detailed above.

It is desirable to provide the circuit-switched service over the packet-switched LTE RAN with a guaranteed QoS. This can optionally be implemented, when the method further comprises: communicating from the MSC to a Policy and Charging Rules Function, PCRF, of the SAE core network, an instruction to ensure communication at a Guaranteed Bit Rate (GBR) between the mobile station and the Media Gateway. The PCRF provides a GBR bearer.

When the circuit-switched service is terminated by either the originating party or the called party, the method optionally further comprises: sending a connection release message between the MSC and MME; and communicating instructions from the MSC to the PCRF to release the guaranteed bit rate communication between the mobile station and the Media Gateway.

Alternatively, the circuit-switched service can be terminated due to loss of radio link between the UE and LTE RAN. Then, the method optionally further comprises: detecting a radio link failure between the mobile station and a base station of the SAE core network; signaling an indication of the radio link failure from the base station to the PCRF; and communicating an instruction from the PCRF to the MSC to terminate the circuit-switched service connection.

When it is not possible to provide the circuit-switched service over the LTE RAN and if the UE can obtain service from a GERAN or UTRAN system, then it may be straightforward to hand over the service. This can beneficially be implemented where the method further comprises: initiating at a LTE Radio Access Network (RAN) base station associated with the SAE core network communicating with the mobile station, a handover of the circuit-switched service from the LTE RAN to a GSM Radio Access Network (GERAN) or UMTS Radio Access Network (UTRAN); and communicating a handover request from the MSC to the Media Gateway, instructing the Media Gateway to direct data for the circuit-switched service over the GSM Radio Access Network. In this approach, the MSC simply changes the addressing information about the Media Gateway.

According further to the system described herein, there is provided a computer readable medium having a computer program operable to carry out the method as described herein recorded thereon.

According further to the system described herein, a mobile radio communication system is provided, comprising: a System Architecture Evolution, SAE, core network arranged to provide packet-switched communications between the mobile station and the SAE core network, the SAE core network comprising a Mobility Management Entity, MME; a Media Gateway, coupled to at least one network external to the SAE core network; and a Mobile Switching Centre, MSC, arranged responsive to a request to initiate a circuit-switched service, to communicate service handling information with the MME and to send instructions for setting up the circuit-switched service through the Media Gateway. The system is further configured to provide packet-switched addressing information for the Media Gateway to the mobile station and to initiate the circuit-switched service at the mobile station over the SAE core network and through the Media Gateway.

In an embodiment, the packet-switched addressing information may include an Internet Protocol, IP, address. The MSC and MME may be configured to communicate service handling information by communicating an encapsulated connection setup message over a SGs interface.

Advantageously, the MME is arranged to receive a command to initiate the circuit-switched service from the mobile station and the encapsulated connection setup message identifies at least one of: the terminating party telephone number; the IP address of the mobile station; and an Access Point Name.

Beneficially, the SAE core network further comprises a Policy and Charging Rules Function, PCRF, and the MSC is further arranged to send to the PCRF an instruction to ensure communication at a guaranteed bit rate between the mobile station and the Media Gateway. Then, the MSC and MME are optionally further adapted to communicate a connection release message, and the MSC is further arranged to communicate instructions to the PCRF to release the guaranteed bit rate communication between the mobile station and the Media Gateway. Additionally or alternatively, the SAE core network further comprises a base station arranged to communicate with the mobile station over a radio link, to detecting a failure in the radio link and to signal an indication of the radio link failure to the PCRF, the PCRF being further adapted to communicate an instruction to the MSC to terminate the circuit-switched service connection.

In many embodiments, the SAE core network further comprises a base station arranged to communicate with the mobile station over a radio link. The base station is optionally further configured to initiate a handover of the circuit-switched service from the SAE core network to a GSM Radio Access Network or UMTS Radio Access Network, the MSC being further adapted to communicate a handover request to the Media Gateway, instructing the Media Gateway to direct data for the circuit-switched service over the GSM Radio Access Network.

BRIEF DESCRIPTION OF THE DRAWINGS

Embodiments of the system described herein will be further explained with reference to the accompanying drawings, in which.

DETAILED DESCRIPTION OF VARIOUS EMBODIMENTS

Figure 1:
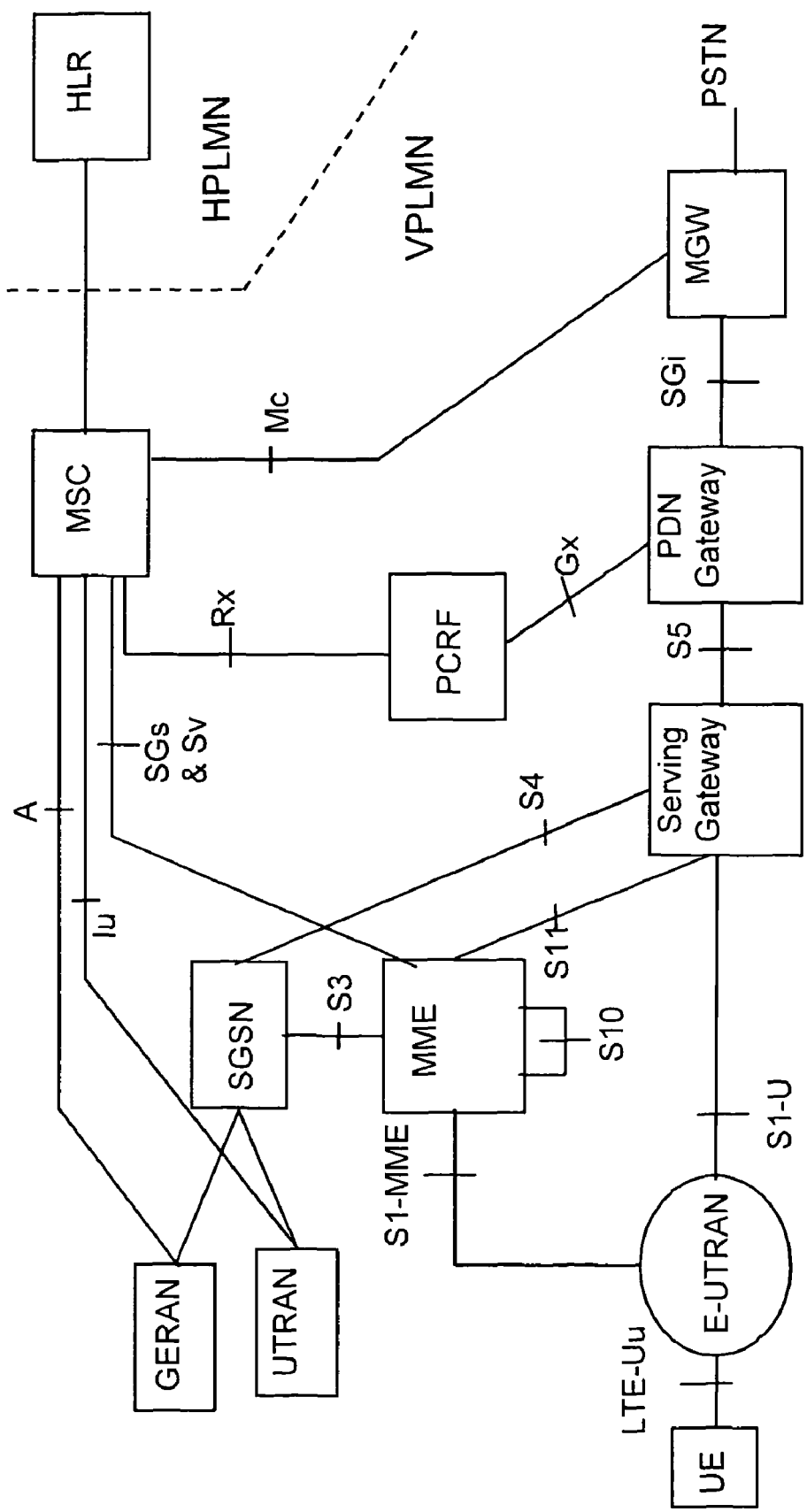
FIG. 1 shows an illustration of a radio network architecture in accordance with an embodiment of the system described herein.

Referring now to FIG. 1, there is shown an illustration of a radio network architecture in accordance with an embodiment of the system described herein.

The radio network architecture comprises: a user equipment (UE); an evolved universal terrestrial radio access network (E-UTRAN); a mobility management entity (MME); a serving GPRS support node (SGSN); a serving gateway; a packet data network (PDN) gateway; a media gateway (MGW); a policy and charging rules function (PCRF); a mobile switching centre (MSC); a home location register (HLR); a GSM-EDGE radio access network (GERAN); and a UMTS terrestrial radio access network (UTRAN). Interfaces between these network components are also labeled. For roaming purposes, the visitor public land mobile network (VPLMN) and home public land mobile network (HPLMN) are also indicated. The MSC is more typically a Mobile Switching Centre Server (MSC-S).

Figure 2:
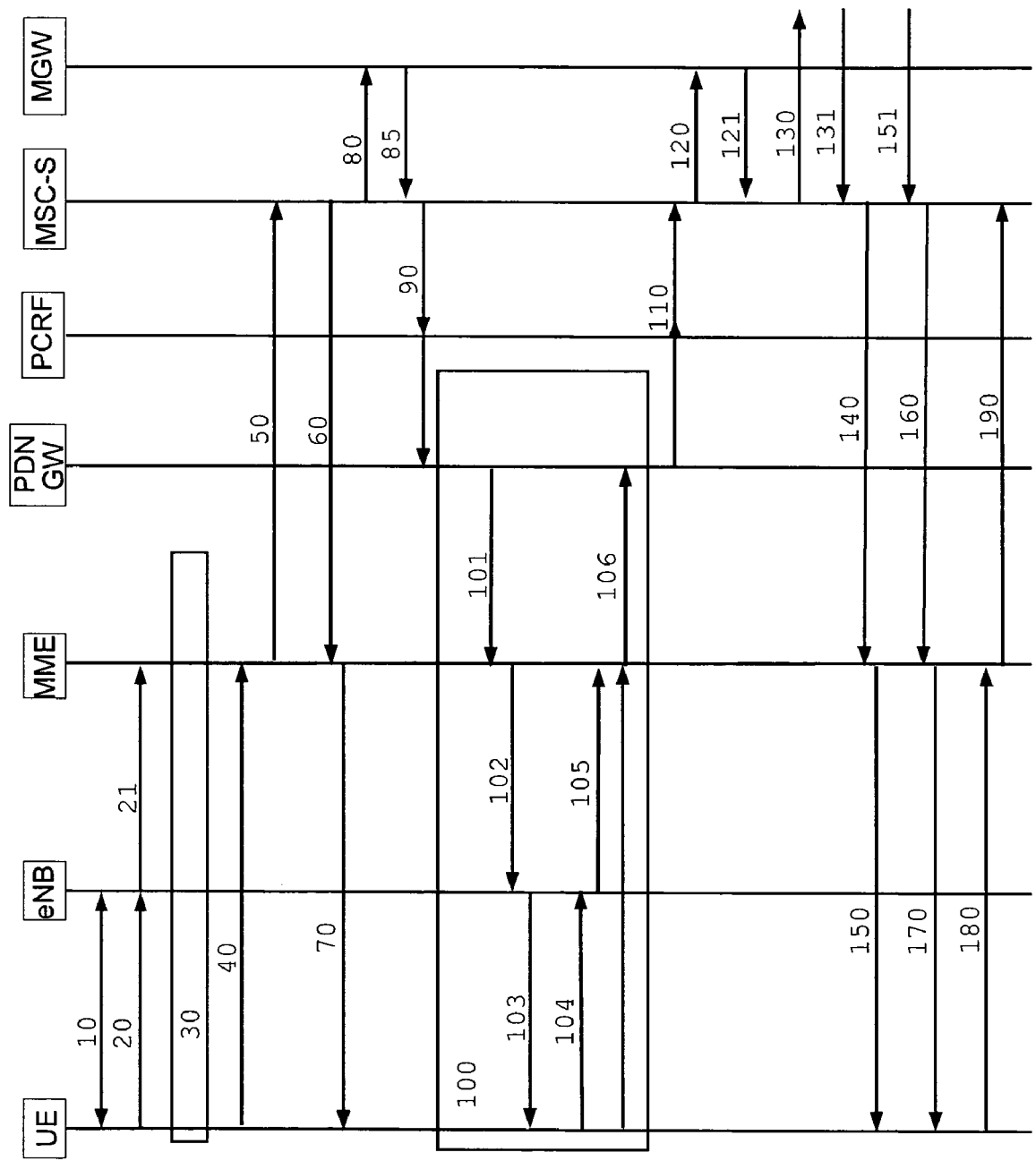
FIG. 2 shows a schematic illustration of the flow of information between nodes in the radio network architecture of FIG. 1, when a mobile device initiates a voice call.

Referring now to FIG. 2, there is shown a schematic illustration of the flow of information between nodes in the radio network architecture of FIG. 1, when a mobile device initiates a voice call. The nodes in the network architecture are identified along the top of the illustration. The eNodeB (eNB) is a main component in the E-UTRAN, equivalent to a base station.

In step 10, the UE uses a random access procedure in order to obtain resource allocation from the eNB. In step 20, the UE sends a service request to the eNB. In step 21, the eNB passes the service request to the MME. In step 30, security procedures are carried out and the S1-U interface between the E-UTRAN and serving gateway is established.

In step 40, a message to set up the circuit-switched voice call is transferred via the uplink non-access stratum (NAS). This is the complete set up message, as defined in 3GPP TS 24.008 v 8.6.0, which is incorporated herein by reference. It therefore includes more than just the called party ("B party") number. It also includes extensions such as the IP address and port for the UE (or IP addresses in the case of a dual stack bearer) and access point name (APN) which is preferably used for voice traffic.

The MSC-s has already determined that the LTE based call setup can be used. The UE signals its support of "CS over SGs" (CSoSGs) to the MME. The MSC then determines its support of CSoSGs. This "capability exchange" is carried out independently of the call establishment and is performed as part of the mobility management carried out before any calls are established.

In step 50, the MME communicates the setup message to the MSC-S over the SGs interface. The complete setup message is encapsulated and also includes charging information, such as the cell identification and time zone. A similar approach was taken in WO-2009/056932. This makes use of the 3GPP TS 29.118 SGs uplink and downlink UNITDATA and 3GPP TS 24.301 uplink and downlink NAS transport messages, these 3GPP documents being incorporated herein by reference. These provide reliable signaling for control and supplementary service signaling (as well as SMS) between the mobile switching centre and UE. The MME is unaware of the contents of these messages.

The use of 3GPP TS 24.007 Protocol Discriminator and Transaction Identifier provides that the MSC and UE can reuse existing 3GPP TS 24.008 DTAP message handling concepts for routing these messages to the correct software modules, these 3GPP documents being incorporated herein by reference. The MSC and UE can use these containers for Call Control and Call Independent Supplementary Service (and other CM layer signaling) sent while the UE is serviced by the E-UTRAN.

In step 60, the MSC-s acknowledges and identifies that the call is proceeding over the SGs interface. This normal call control signaling indicates its support of CSoSGs back to the MME. The MME then passes this call proceeding message in the downlink to the UE over the NAS transport protocol in step 70.

The MSC-server uses configuration data to determine whether to keep the call in the LTE RAN or move it to the GERAN or UTRAN. The cell identification and TAI that are added to the SGs interface signaling may be used to aid this process. In this embodiment, the MSC-server decides to keep the call over the LTE RAN.

In step 80, the MSC-s sends an addressing request for resources to the MGW, identifying the A Party (calling party) and B Party (terminating party) legs. This requests that the MGW provide an IP address and/or port number on which to send and receive RTP packets from and/or to the UE. In step 85, the MGW provides an address reply.

In step 90, the MSC-s sends a reserve resources request to the PCRF. This uses the UE IP address or its MSISDN to initiate a network initiated dedicated bearer establishment. The reserve resources request, also including the MGW IP address and port and TID is then passed on to the PDN GW.

The PDN GW then sets up a network initiated dedicated bearer establishment 100. In step 101, a bearer request is created to the MME. In step 102, a bearer setup request message is sent from the MME to the eNB. In step 103 an RRC reconfiguration request is sent from the eNB to the UE. In step 104, the UE sends an RRC reconfiguration response to the eNB. In step 105 a bearer setup response is sent from the eNB to the MME. In step 106 a bearer response is created between the UE and PDN GW. In step 110, a reserve resources response is sent from the PDN GW to the MSC-s. In step 120 a Mod request is sent to the MGW from the MSC-s, providing the MGW with the UE IP address and in step 121 a Mod reply is received.

The remaining steps of the process are all normal call control signaling. In step 130, an IAM message is sent and in step 131, an ACM message is received in response. Consequently, in step 140, an alerting message is sent from the MCS-s to the MME over the SGs interface. This message is transferred to the UE from the MME over the NAS protocol. A text message is then sent from the MSC-s to the MME in step 160, and in step 170, this is transferred to the UE over the NAS protocol. In step 180, the UE sends a connect acknowledgement over the NAS protocol and in step 190, this is forwarded over the SGs interface to the MSC-s. The voice call then proceeds over the UE to MGW link.

Figure 3:
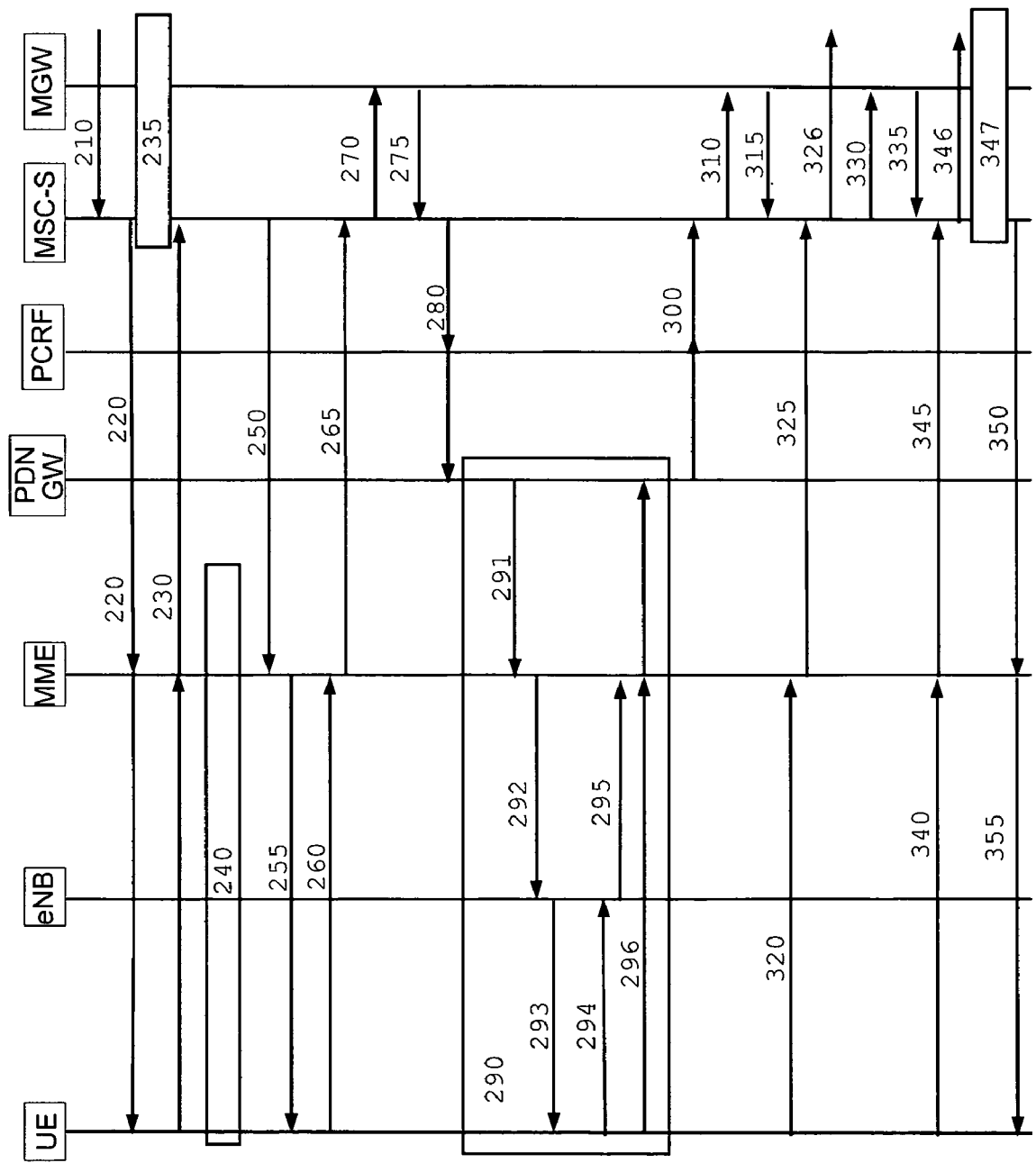
FIG. 3 shows a schematic illustration of the flow of information between nodes in the radio network architecture of FIG. 1, when a mobile device receives a voice call.

Referring now to FIG. 3, there is shown an illustration of the flow of information between nodes in the radio network architecture of FIG. 1, when a mobile device receives a voice call.

For a mobile terminating (MT) voice call, in step 210, an IAM message is received at the MSC-s. In step 220, the MSC-s sends a paging messaging to the UE via the MME. In step 230, the UE returns a service request (paging response), including charging information, for example the cell identification. This is returned to the MCS-s via the MME. In step 235, CN bearer establishment is implemented. In step 240, security procedures and establishment of the S1-U interface are made.

In step 250, the MSC-s sends the setup information to the MME over the SGs interface. In existing CSFB implementations, the MSC-s would send a the setup information on the A/I interface on another radio network instead of this step. The MME then forwards this message over the NAS transport protocol to the UE, in step 255. The UE then replies with a call confirmed message, including the UE IP address and port using the NAS transport protocol to the MME. This is in step 260. In step 265, this is forwarded from the MME to the MSC-s over the SGs interface.

The MSC-s then communicates with the MGW with an addressing request in step 270 and addressing reply in step 275. This is equivalent to the corresponding steps 80 and 85 in FIG. 2.

In step 280 the MSC-s sends a reserve resource request towards the PDN GW. This includes the MGW IP address and port and TID. In step 290, a network initiated dedicated bearer establishment takes place. This is equivalent to the similar procedure carried out in step 100 in FIG. 2. In step 291, a create bearer request is sent. In step 292, a bearer setup request is sent. In step 293, an RRC reconfiguration request is sent. In step 294, an RRC reconfiguration response is transmitted. In step 295 a bearer setup response is sent. Finally, in step 296, a create bearer response is sent.

A reserve resources response is sent from the PDN GW to the MSC-s in step 300. Then, a Mod request is sent from the MSC-s to MGW in step 310 and a Mod reply is sent from the MGW to MSC-s in step 315.

The UE then sends an alerting message over the NAS transport protocol to the MME. This is forwarded over the SGs interface to the MSC-s in step 325. An ACM message is then sent from the MSC-s in step 326. A further Mod request is sent from the MSC-s to MGW in step 330 and a Mod reply is received in step 335. In step 340, a connect message is sent from the UE to the MME over the NAS transport protocol. This is forwarded to the MSC-s over the SGs interface in step 345. In step 346 an ANS message is sent from the MSC-s. Connect legs are carried out in step 347. In step 350, the connect acknowledgement is sent over the SGs interface from the MSC-s to the MME. Then, this is forwarded to the UE over the ANS transport protocol. The voice call is then initiated between the UE and MGW.

The eNodeB can request handover in the style of the existing Single Radio Voice Call Continuity (SRVCC) functionality to a circuit-switched domain GERAN or UTRAN, whenever this is needed. The MSC-server will contact the MGW to obtain A/Iu-cs user plane resources and to release the previously allocated RTP port and IP address.

Figure 4:
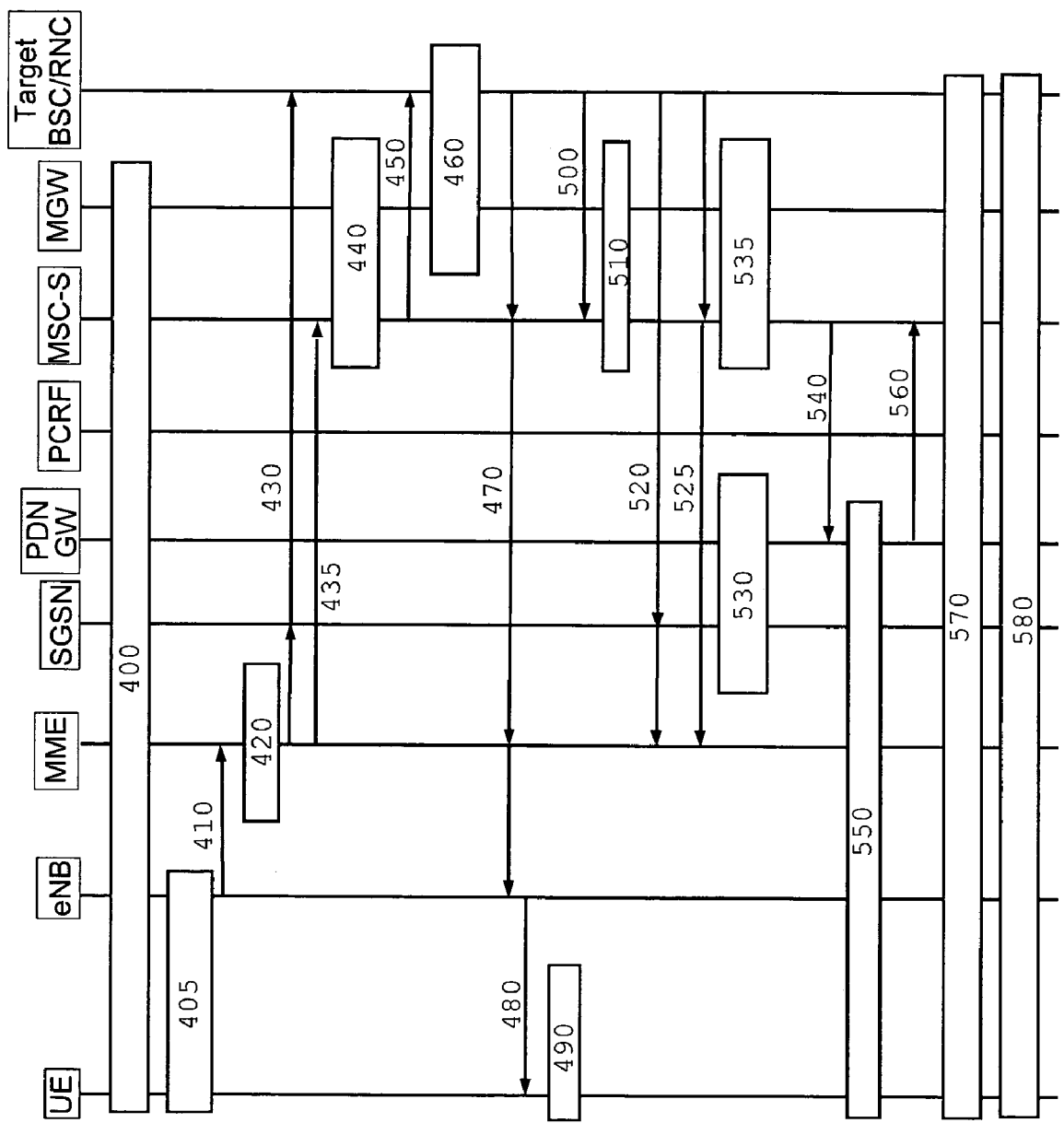
FIG. 4 shows a schematic illustration of the flow of information between nodes in the radio network architecture of FIG. 1, for handover of a voice call from a E-UTRA LTE RAN to a GERAN or UTRAN system.

This handover procedure is now described with reference to FIG. 4, which shows a schematic illustration of the flow of information between nodes in the radio network architecture of FIG. 1, for handover of a voice call from a E-UTRA LTE RAN to a GERAN or UTRAN system. Step 400 identifies an ongoing CSoSGs or Voice over SGs call. Step 405 identifies measurement reports between the UE and eNB., In step 410, a handover requirement is identified. Step 420 identifies a bearer splitting is needed. In step 430 the relocation requirement message is sent from the MME to the target BSC/RNC. In step 435, the handover requirement message is sent from the MME to the MSC-s. These steps are all part of the current SRVCC procedures and use the Sv interface shown in FIG. 1. However, the SGs interface could alternatively be used.

In step 440, resources are created for the target RNC. In step 450, the handover requirement message is sent from the MSC-s to the target BSC/RNC. In step 460 user plane establishment is set up between the MGW and target BSC/RNC.

The target BSC/RNC then sends the handover requirement acknowledgement to the eNB in step 470. The eNB then sends the handover command to the UE in step 480. In step 490, the UE retunes to the new RAN.

In step 500, which is optional and, in various embodiments, may not be carried out, the target BSC/RNC sends a relocation text message to the MSC-s. In step 510, bi-casting is established. The MSC-s and/or MGW signaling is configured to permit bi-casting and/or reception on both A/Iu-cs and Gi routes in order, to reduce the speech interruption at the handover.

In step 520, the target BSC/RNC sends a relocation complete message to the MME. In step 525, the target BSC/RNC sends a handover complete message to the MSC/s which then forwards it to the MME. In step 530, bearer modification is carried out for routing and in step 535, the old resources are released. In step 540, a resource release request is sent from the MSC-s to the PDN GW and this is then implemented as a voice barrier release (on target access) in step 550. In step 560, a resource release response is sent from the PDN GW to the MSC-s.

In step 570, a circuit switched over legacy access mechanism call is the initiated. In step 580, selective RAU (context sync) is established. The handover to the 2G or 3G RAN is then complete.

After handover to GERAN or UTRAN a handover back to E-UTRAN can be performed. In order to achieve this, the MSC can provide the MGW IP address/port number to the mobile device/UE. This can be done either by adding this information to the A/Iu-cs and radio interface handover command messages, or by putting into "dummy" call control messages, for example an otherwise empty user-user or notify or progress signaling message.

Call release preferably uses the normal 3GPP TS 24.008 call control messages, sent within the container messages transmitted over the SGs and NAS transport protocol interfaces. In addition, the MSC preferably instructs the PCRF to release the GBR bearers.

Loss of coverage over the E-UTRAN causes a radio link failure. This leads to the eNB releasing the S1 connection between the serving gateway and E-UTRAN and between the E-UTRAN and MME. With a GBR dedicated bearer active, this causes signaling back to the PCRF via the serving gateway and PDN GW. The PCRF then informed the MSC which then releases the call.

The MSC can generate the call detail records and support customer care/police enquiries, using changes proposed in 3GPP change request S2-095178, which is incorporated herein by reference.

Unstructured supplementary service data (USSD) is supported. This uses the CISS signaling and is encapsulated in the messages transferred over the SGs and NAS transport protocol interfaces.

The skilled person will be aware that various modifications to the above-identified embodiment can be made. For example, an alternative to setting up a network initiated dedicated bearer establishment is that the UE can use the MGW IP address received to perform a UE initiated resource request, in order to initiate the GBR bearer.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of initiating a circuit-switched service at a mobile station over a System Architecture Evolution (SAE) core network using packet-switched communications between the mobile station and the SAE core network, the method comprising:
   communicating service handling information between a Mobile Switching Centre (MSC) and the mobile station through a Mobility Management Entity (MME) of the SAE core network;
   sending instructions from the MSC for setting up the circuit-switched service through a Media Gateway, coupled to at least one network external to the SAE core network;
   providing packet-switched addressing information for the Media Gateway to the mobile station;
   initiating the circuit-switched service at the mobile station over the SAE core network and through the Media Gateway, wherein communicating the service handling information includes communicating an encapsulated connection setup message between the MSC and the MME over an SGs interface that provides for setup, using the SGs interface, of a voice connection over the SAE core network; and
   communicating from the MSC to a Policy and Charging Rules Function (PCRF) of the SAE core network, an instruction to ensure communication at a guaranteed bit rate between the mobile station and the Media Gateway.

2. The method of claim 1, wherein the packet-switched addressing information includes an Internet Protocol (IP) address.

3. The method of claim 1, wherein the MSC receives a command to initiate the circuit-switched service and the encapsulated connection setup message identifies at least one of: a terminating party telephone number; an IP address of the mobile station; and an Access Point Name.

4. The method of claim 1, further comprising:
   sending a connection release message between the MSC and MME; and
   communicating instructions from the MSC to the PCRF to release the guaranteed bit rate communication between the mobile station and the Media Gateway.

5. The method of claim 1, further comprising:
   detecting a radio link failure between the mobile station and a base station of the SAE core network;
   signaling an indication of the radio link failure from the base station to the PCRF; and
   communicating an instruction from the PCRF to the MSC to terminate the circuit-switched service connection.

6. The method of claim 1, further comprising:
   initiating at a LTE Radio Access Network base station associated with the SAE core network communicating with the mobile station, a handover of the circuit-switched service from the LTE Radio Access Network to a GSM Radio Access Network or UMTS Radio Access Network; and
   communicating a handover request from the MSC to the Media Gateway, instructing the Media Gateway to direct data for the circuit-switched service over the GSM Radio Access Network.

7. A mobile radio communication system, comprising:
   a System Architecture Evolution (SAE) core network arranged to provide packet-switched communications between the mobile station and the SAE core network, the SAE core network comprising a Mobility Management Entity (MME);
   a Media Gateway, coupled to at least one network external to the SAE core network; and
   a Mobile Switching Centre (MSC) arranged responsive to a request to initiate a circuit-switched service, to communicate service handling information with the MME and to send instructions for setting up the circuit-switched service through the Media Gateway; and
   wherein the system is further configured to provide packet-switched addressing information for the Media Gateway to the mobile station and to initiate the circuit-switched service at the mobile station over the SAE core network and through the Media Gateway,
   wherein the MSC and MME are configured to communicate the service handling information by communicating an encapsulated connection setup message over an SGs interface that provides for setup, using the SGs interface, of a voice connection over the SAE core network;
   wherein the SAE core network further comprises a Policy and Charging Rules Function (PCRF) and the MSC is further arranged to send to the PCRF an instruction to ensure communication at a guaranteed bit rate between the mobile station and the Media Gateway.

8. The mobile radio communication system of claim 7, wherein the packet-switched addressing information comprises an Internet Protocol (IP) address.

9. The mobile radio communication system of claim 7, wherein the MME is arranged to receive a command to initiate the circuit-switched service from the mobile station and the encapsulated connection setup message identifies at least one of: a terminating party telephone number; an IP address of the mobile station; and an Access Point Name.

10. The mobile radio communication system of claim 7, wherein the MSC and MME are further adapted to communicate a connection release message, and the MSC is further arranged to communicate instructions to the PCRF to release the guaranteed bit rate communication between the mobile station and the Media Gateway.

11. The mobile radio communication system of claim 7, wherein the SAE core network further comprises a base station arranged to communicate with the mobile station over a radio link, to detecting a failure in the radio link and to signal an indication of the radio link failure to the PCRF, the PCRF being further adapted to communicate an instruction to the MSC to terminate the circuit-switched service connection.

12. The mobile radio communication system of claim 7, wherein the SAE core network further comprises a base station arranged to communicate with the mobile station over a radio link and to initiate a handover of the circuit-switched service from the SAE core network to a GSM Radio Access Network or UMTS Radio Access Network, the MSC being further adapted to communicate a handover request to the Media Gateway, instructing the Media Gateway to direct data for the circuit-switched service over the GSM Radio Access Network.

13. A non-transitory computer readable medium storing computer program operable to initiate a circuit-switched service at a mobile station over a System Architecture Evolution (SAE) core network using packet-switched communications between the mobile station and the SAE core network, the computer program comprising:
   executable code that communicates service handling information between a Mobile Switching Centre (MSC) and the mobile station through a Mobility Management Entity (MME) of the SAE core network;
   executable code that sends instructions from the MSC for setting up the circuit-switched service through a Media Gateway, coupled to at least one network external to the SAE core network;
   executable code that provides packet-switched addressing information for the Media Gateway to the mobile station; and
   executable code that initiates the circuit-switched service at the mobile station over the SAE core network and through the Media Gateway, wherein the executable code that communicates the service handling information includes executable code that communicates an encapsulated connection setup message between the MSC and the MME over an SGs interface that provides for setup, using the SGs interface, of a voice connection over the SAE core network; and
   executable code that communicating from the MSC to a Policy and Charging Rules Function, PCRF, of the SAE core network, an instruction to ensure communication at a guaranteed bit rate between the mobile station and the Media Gateway.

14. The non-transitory computer readable medium of claim 13, wherein the packet-switched addressing information includes an Internet Protocol (IP) address.

15. The non-transitory computer readable medium of claim 13, wherein the MSC receives a command to initiate the circuit-switched service and the encapsulated connection setup message identifies at least one of: a terminating party telephone number; an IP address of the mobile station; and an Access Point Name.

16. The non-transitory computer readable medium of claim 13, wherein the computer program further comprises:
   executable code that sends a connection release message between the MSC and MME; and
   executable code that communicates instructions from the MSC to the PCRF to release the guaranteed bit rate communication between the mobile station and the Media Gateway.

17. The non-transitory computer readable medium of claim 13, wherein the computer program further comprises:
   executable code that detects a radio link failure between the mobile station and a base station of the SAE core network;
   executable code that signals an indication of the radio link failure from the base station to the PCRF; and
   executable code that communicates an instruction from the PCRF to the MSC to terminate the circuit-switched service connection.

18. The non-transitory computer readable medium of claim 13, wherein the computer program further comprises:
   executable code that initiates at a LTE Radio Access Network base station associated with the SAE core network communicating with the mobile station, a handover of the circuit-switched service from the LTE Radio Access Network to a GSM Radio Access Network or UMTS Radio Access Network; and
   executable code that communicates a handover request from the MSC to the Media Gateway, instructing the Media Gateway to direct data for the circuit-switched service over the GSM Radio Access Network.

* * * * *